(12) United States Patent
Clark (10) Patent No.: US 7,349,604 B2
(45) Date of Patent: Mar. 25, 2008

(54) METHOD AND APPARATUS FOR ALIGNING OPTICAL COMPONENTS

(75) Inventor: Stephan Clark, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/345,103

(22) Filed: Jan. 31, 2006

(65) Prior Publication Data

US 2007/0177842 A1   Aug. 2, 2007

(51) Int. Cl.
*G02B 6/42* (2006.01)
*G02B 7/02* (2006.01)

(52) U.S. Cl. .......................... 385/52; 359/811; 359/813

(58) Field of Classification Search .................. None
See application file for complete search history.

(56) References Cited

U.S. PATENT DOCUMENTS

| 5,253,834 | A | 10/1993 | Sullivan et al. | |
| 6,512,642 | B1* | 1/2003 | Bourcier et al. | 359/813 |
| 6,571,041 | B2 | 5/2003 | Bourcier et al. | |
| 7,146,082 | B2* | 12/2006 | Zbinden | 385/50 |
| 2003/0026548 | A1* | 2/2003 | Bourcier et al. | 385/52 |

* cited by examiner

*Primary Examiner*—Tim M. Wong (57) ABSTRACT

Methods and apparatuses are provided for aligning two optical components. Two optical components are aligned by stacking a first, a second, and a third transparent optical element between two optical components. The optical components are adjusted in the x, y, and z-axes, and rotations about the x, y, and z-axes.

13 Claims, 9 Drawing Sheets

METHOD AND APPARATUS FOR ALIGNING OPTICAL COMPONENTS

BACKGROUND

With the continued adoption of digital projectors in the home and business marketplaces, there is a need to produce brighter and better quality images to satisfy consumer's desires. Color projectors typically fall into two major categories, projectors having a single light modulator with a color wheel, and projectors having three light modulators without a color wheel. Generally, three modulator projector systems produce superior images to single modulator projection systems, especially in the areas of brightness and color resolution.

Digital projectors serve the consumer in two fashions, rear projection and front projection. Rear projection is a cost attractive option to plasma, field emission, and liquid crystal displays. Front projection serves the consumer in home theaters, conference rooms, and auditoriums where business or entertainment presentations are often shown.

One trend in digital projection is to satisfy consumer's desires for increased image quality using projectors with three modulators. However, precise optical alignment of the three modulators is required to render the desired superior image quality. Existing mechanisms to mount and align the modulators are complex and can be bulky and expensive. If a simple, compact, and cost effective solution for aligning three modulators in a projector is not developed, then consumer adoption of three modulator projectors, with their superior image quality, will be hampered.

BRIEF DESCRIPTION OF THE DRAWINGS

The invention is better understood with reference to the following drawings. The elements of the drawings are not necessarily to scale relative to each other; rather, emphasis has instead been placed upon clearly illustrating the invention. Furthermore, like reference numerals designate corresponding similar parts through the several views.

DETAILED DESCRIPTION

This invention is directed to an apparatus and adjustment method to precisely align optical components relative to each other and to minimize unwanted reflections from the optical component interfaces using a simple, low cost, small size, and lightweight precision adjustment mechanism. The apparatus is capable of positioning optical components relative to each other in the x, y, and z-axes and their rotation about the x, y, and z-axes. The apparatus reduces the number of air gaps between optical elements thereby reducing unwanted reflections from an optical assembly.

In optical systems, it is frequently necessary to align one optical component to another optical component. Examples of alignment are, but not limited to, aligning a photo-emitter to a photo-detector, a fiber-optic to a lens, a projection image onto a photo-sensor or photo-array, and alignment of a light modulator to a prism.

Figure 1:
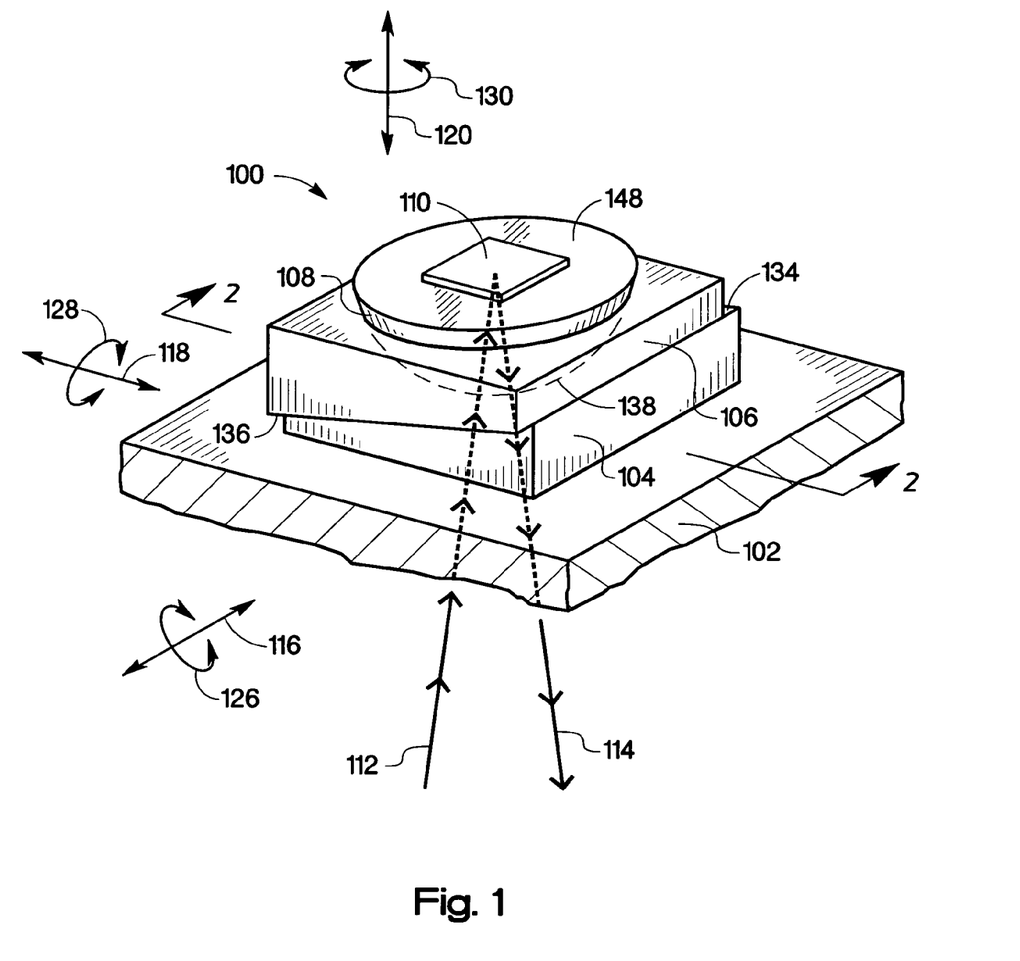
FIG. 1 is an illustrated diagram of optical components, optical elements and an optical assembly for aligning optical components according to an embodiment of the invention.

FIG. 1 shows an illustration of an optical assembly 100 for aligning optical components according to an embodiment of the invention. An optical assembly 100 has a first optical component 102 and a second optical component 110. Alignment of these two optical components with respect to each other is accomplished using a first optical element as a wedge 104, a second optical element as a wedge 106, and a third optical element as a partial sphere 108 with a planar surface 148. The first optical component 102, the first optical wedge 104, the second optical wedge 106, and the optical partial sphere 108 are all optically transparent so that light can pass through these elements as shown by an incident beam of light 112 passing through the first optical component 102, optical elements 104, 106, and 108, and reflecting off the second optical component 110 to form a reflected beam of light 114 passing back through optical elements 108, 106, and 104, and optical component 102.

As an example, the first optical component 102 may be, but is not limited to, one face of an optical prism used in a projector. The second optical component 110, may be, but is not limited to, an optical modulator. An optical modulator is sometimes called a spatial light modulator and used to render images in front and rear projection systems.

Since both optical components and opto-electronic components are widely used in a variety of products, the embodiments of the invention described herein are applicable to a broad category of optical and opto-electronic devices and systems. There are many examples of optical and opto-electronic systems for which this invention applies; including, but not limited to, rangefinders, magnifiers, binoculars, telescopes, spectrometers, microscopes, analytical equipment, optical communication equipment, and fabrication equipment.

In an embodiment of the invention, the first optical component 102 represents, for example, the face of a prism used in a projection system; although, the first optical component 102 can also be an optical plate, an optical filter, and optical lens, a polarizer, or another optical component. The second optical component 110 in the embodiment of the invention represents, for example, a spatial light modulator used in a projection system. However, the second optical component can also be a photodiode, a photodiode array, a photodiode matrix, or another type of opto-electronic component.

It is not necessary for the first optical component 102 to be proximate to the first optical element 104 or for the second optical component 110 to be proximate to the third optical element 108. It is also possible to have the first optical component 102 proximate to the third optical element 108 and the second optical component 110 proximate to the first optical element 104.

The optical assembly 100 is described in more detail below. As mentioned above, the first optical element 104 is proximate to the first optical component 102. Although the first optical element 104 is shown as a wedge, this is not a requirement, and will be described in reference to FIG. 3 and FIG. 4. The first optical element 104 may be positioned relative to the first optical component 102 in the x-direction which is called the x-axis 116, the y-direction which is called the y-axis 118, rotation about the z-axis 130, or any combination thereof. In this manner, the first optical element 104 may be positioned on the first optical component 102 in a manner which facilitates ultimate alignment of the first optical component 102 to the second optical component 110.

A second optical element 106 is proximate to the first optical element 104. The second optical element 106 is shown to be a wedge; however, it is not required to be, as will be described in reference to FIG. 3 and FIG. 4. The second optical element 106 has a surface 136 which is slidably coupled to the surface 134 of the first optical element 104. The second optical element 106 can be positioned relative to the first optical element 104 in the x-axis 116, the y-axis 118, and rotation around the z-axis 130 or any combination thereof. Movement of second optical element 106 in the y-axis 118 relative to first optical element 104 will effect z-axis 120 positioning of the second optical element 106 in the z-axis, which ultimately effects the z-axis 120 positioning of the second optical component 110 through the third optical element 108. Positional adjustments in the z-axis 120 are important for optical systems because z-axis 120 adjustments are often in the image plane and these z-axis adjustments are often required to properly focus an image.

A partially spherical recess 138 in the face of second optical element 106 accepts a partially spherical third optical element 108. The optical partial sphere 108 has a radius substantially similar to the radial recession 138 in second optical element 106. Partially spherical optical element 108 is slidably coupled to the radial recession 138. The substantially similar radii between the partially spherical optical element 108 and the radial recession 138 in optical element 106 allows the partially spherical optical element 108 to rotate in the recession 138 around the x-axis 126, the y-axis 128, the z-axis 130, or any combinations thereof. Since the second optical component 110 is proximate to the third optical element 108, the second optical component 110 can also rotate relative to the first optical component 102 around the x-axis 126, the y-axis 128, the z-axis 130 or any combination thereof. The second optical component 110 can also be positioned relative to optical element 108 in the x-axis 116, the y-axis 118, and the rotation about the z-axis 130 or any combination thereof.

An optical assembly 100 is formed from a stack of the first optical component 102, the first optical element 104, the second optical element 106, the third optical element 108, and the second optical component 110. Optical elements 104, 106, and 108 can be positioned relative to each other so that the second optical element 110 is properly aligned to the first optical component 102 in the x-axis 116, the y-axis 118, the z-axis 120, the rotation around the x-axis 126, the rotation around the y-axis 128, the rotation around the z-axis 130 or any combination thereof. Once this six-direction position adjustment has been used to properly align optical component 102 to 110, the optical assembly 100 can be fixed in place by clamping the optical elements and components together, affixing the optical components and elements with an adhesive, or by other adhering or attachment methods. Use of a liquid adhesive prior to formation of the optical stack mentioned above may have the desirable effect of reducing sticking friction between optical elements and between optical elements and components. The reduced sticking friction can enable easier precision alignment of the components and elements.

An air gap between the optical elements or components has the potential to cause unwanted reflections. In projection systems, this unwanted reflection is called ghosting. The use of a liquid adhesive fills the air gap between the optical elements or components. The ghosting can be substantially reduced or eliminated by filling the air gap with an adhesive that has a similar refractive index to the optical elements or components. When the refractive index substantially matches optical elements or optical components, there is minimal refraction and the possibility of reflection when light passes from one medium to another. For example, light passes through a first medium such as an optical component having a first refractive index, a second medium having a second refractive index, such as an air gap, and a third medium having a third refractive index such as an optical element. The first and third media have substantially similar refractive indices, since they are typically made from the same material, for instance, optical glass or plastic. However, the air gap, as the second medium, has a substantially different refractive index than the first or third media. Due to the mismatch of the refractive index between the air gap and the first or third media, there is a possibility of an undesirable reflection or ghosting in an image. To largely mitigate this problem, the air gap can be filled with a liquid, such as a transparent liquid adhesive which has a substantially similar optical refractive index to the first and third media, thereby essentially eliminating the possibility of unwanted reflections or ghosting. When the liquid adhesive cures, the optical refractive index and the transparency are essentially unchanged, and the reduction of unwanted reflections and ghosting is preserved. Therefore, when the adhesive cures, not only does the adhesive function to affix the optical elements and components, but the adhesive also index matches between the two. Use of a substantially similar optical refractive index material disposed next to a material with a particular optical index of refraction is called index matching.

Figure 2:
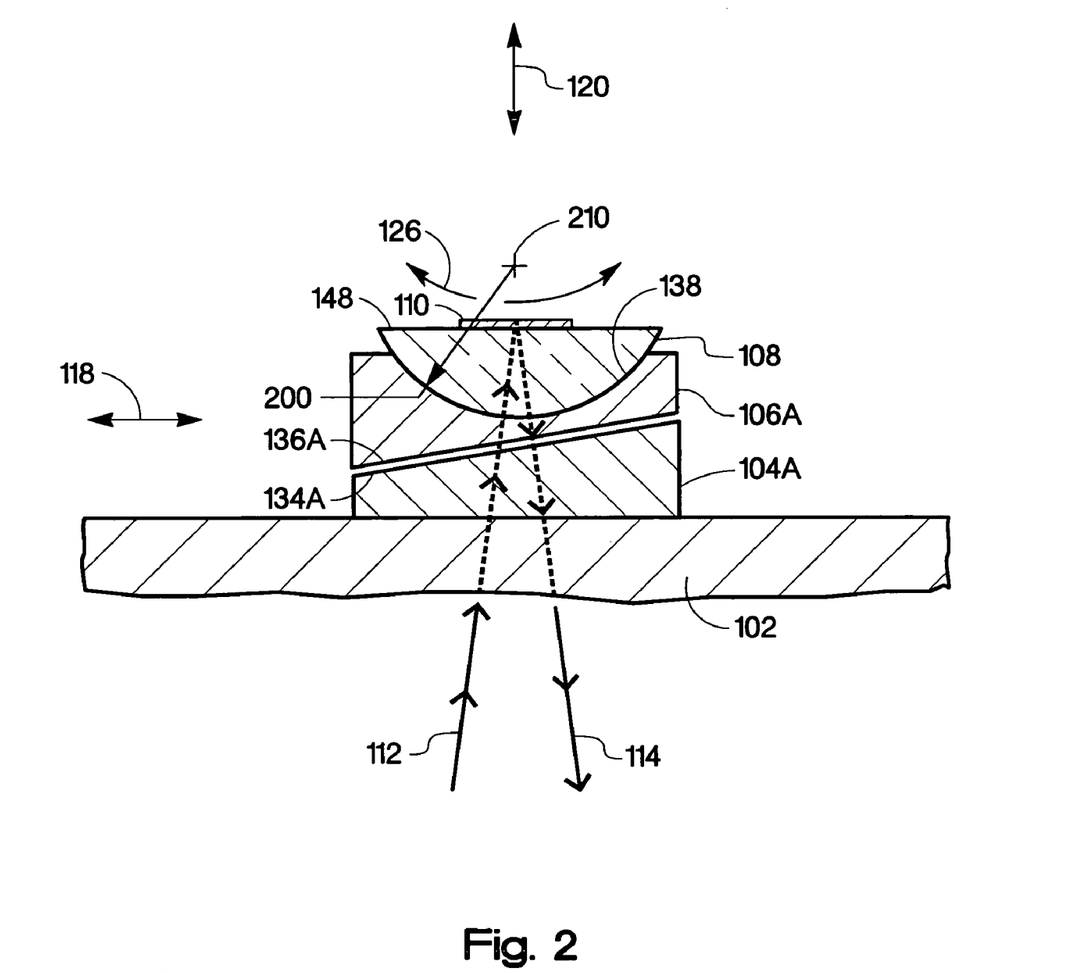
FIG. 2 shows a cross-sectional view of FIG. 1 according to an embodiment of the invention.

FIG. 2 shows a cross section of FIG. 1 according to an embodiment of the invention. As mentioned in reference to FIG. 1, the first optical element 104A is wedge shaped and is proximate to the first optical component 102. The second optical element 106A is also wedge shaped and is proximate to the optical element 104A. The second optical element 106A has a partial spherical recession 138 with a radius 200 and a center 210. The third optical element 108 is partially spherical with a planar surface 148. The spherical portion of the third optical element 108 has substantially the same radius 200 as the spherical recession 138 of the second optical element 106A. The second optical component 110 is proximate to the planar surface 148 of the partially spherical optical element 108. The position of the second optical component 110 may be adjusted relative to the first optical component 102 using a stack of the first optical component 102, the first optical element 104A, the second optical element 106A, the third optical element 108, and the second optical component 110. This adjustment is accomplished by positioning optical elements 104A, 106A and 108 as described below.

Optical element 104A may move relative to optical component 102 in the y-axis 118 to achieve alignment between the first optical component 102 and the second optical component 110 in the direction of the y-axis 118.

The surface 136A of the second optical element 106A is slidably coupled to the surface 134A of the first optical element 104A. When the wedge shaped second optical element 106A slides with respect to the wedge shaped first optical element 104A in the y-axis 118, the two wedges move past each other creating a positional change in the z-axis 120 between the first optical element 104A and the second optical element 106A. This z-axis 120 positional change adjusts the focal distance between first optical component 102 and second optical component 110 through optical element 108.

The second optical element 106A has a spherical recession 138 in the surface opposite to the first optical element 104A. The third optical element 108 is a partially spherical optical element, where the spherical portion of the third optical element 108 is slidably placed in the recession 138 of the second optical element 106A. As such, the partially spherical third optical element 108 can be rotated within the recession 138 of the second optical element 106A in the radial direction 126 rotating around the center 210 of the radius 200 in a direction rotating around 126 the x-axis 116 as shown in FIG. 1. The rotation 126 may be used to adjust the degree of parallelness or planarity between the first optical component 102 and second optical component 110. Since manufacturing and assembly process variation of optical elements and components is common, it is often necessary to align optical components 102 and 110 to be parallel by using the rotary adjustment in the radial direction 126 to rotate optical component 110 with respect to optical component 102 for achieving planarity between the two optical components.

The second optical component 110 may also be positioned relative to the planar face 148 of the partially spherical third optical element 108 for the purpose of aligning the first optical component 102 to the second optical component 110 in the direction of the y-axis 118.

Since the optical components and optical elements are transparent, the incident beam of light 112 passes through the first optical component 102, optical elements 104A, 106A, and 108, and is reflected off the second optical component 110. The reflected beam of light 114 then passes back through optical elements 108, 106A, and 104A, and the first optical component 102. Using the previously described adjustments, the reflected beam of light 114 can be properly aligned in angle, focus, and position, relative to the incident beam of light 112. Also, since air gaps can be filled with an adhesive or fluid that matches the refractive index of the optical components and optical elements, unwanted reflections called ghosting are minimized.

It is not necessary for the optical component 110 to reflect the beam of light 112. The second optical component 110 may be a lens, a filter, an optical-fiber, a photo-sensor, or another optical component where the incident beam of light 112 passes into the second optical component 110 that has been properly aligned to optical component 102 using optical elements 104A, 106A, and 108.

Figure 3A:
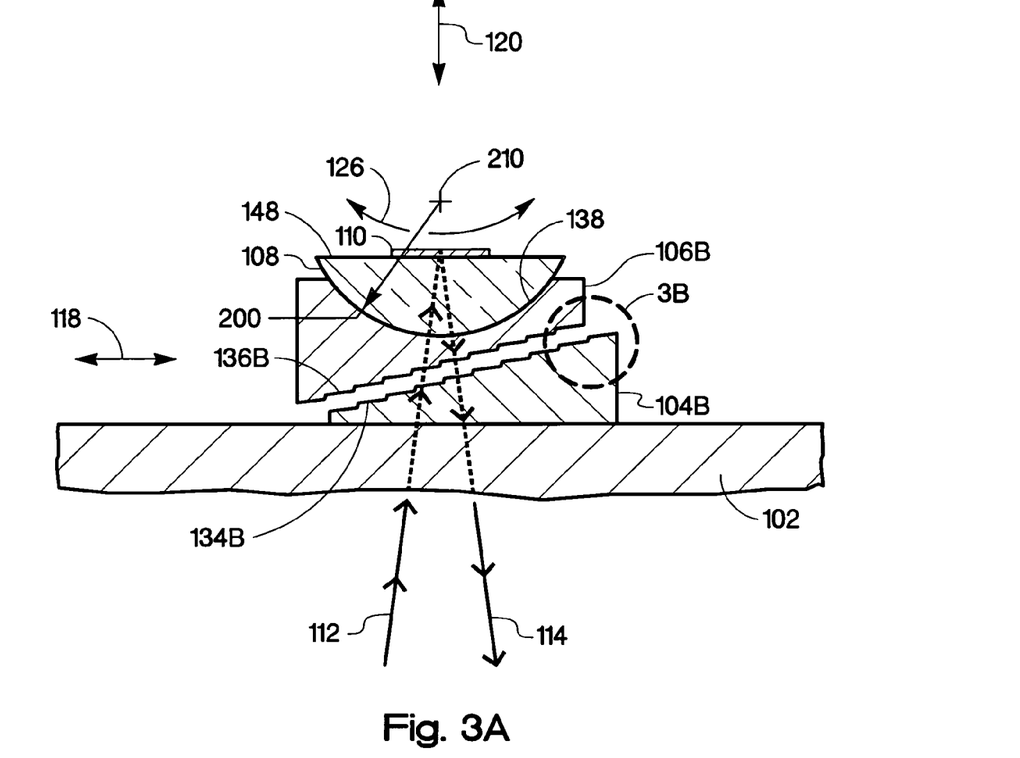
FIG. 3 is a cross-sectional view of another embodiment of the invention.

FIG. 3A is another cross sectional view of an embodiment of the invention. The cross section in FIG. 3 is similar to the cross section in FIG. 2, however, the surface of the first optical element 104B has a terraced profile 134B and a substantially similar terraced profile 136B is on the surface of the second optical element 106B. Terraced profile 136B mirrors and closely matches the terraced profile 134B of optical element 104B, such that when optical element 106B is mated with first optical element 104B, the two profiles fit closely together with a minimum of voids. The terraced profiles 134B and 136B, facilitate the adjustment of optical element 104B with respect to optical element 106B since the optical elements 104B and 106B are less likely to slide or move with respect to each other during assembly. Also, after assembly, optical elements 104B and 106B are less likely to move relative to each other when coupled or bonded together because the increased surface area and irregularities from the terracing provides a greater contact area for an adhesive, which results in an increase in adhesion when bonded together by an adhesive. Therefore, after assembly, optical elements 104B and 106B are less likely to separate from mechanical shock or mechanical vibration. As a result, the terracing creates a more mechanically robust assembly of optical elements. Also, due to the increased surface area between the optical elements, it is less likely that the optical elements will separate from each other when subjected to thermal cycles.

The terraced profile has individual steps, which can be made sufficiently small in z-axis 120 height such that each step for the z-axis 120 adjustment of optical element 106B with respect to optical element 104B has sufficient resolution for precisely focusing the second optical component 110 to the first optical component 102. The terraced profile can provide a discrete resolution adjustment for the focus in the z-axis 120. The discrete resolution adjustment can be beneficial because the steps are incremental and discrete thereby limiting the number of available possibilities of z-axis 120 adjustment. The reduced number of z-axis adjustment provides for an easier adjustment procedure.

Figure 3B:
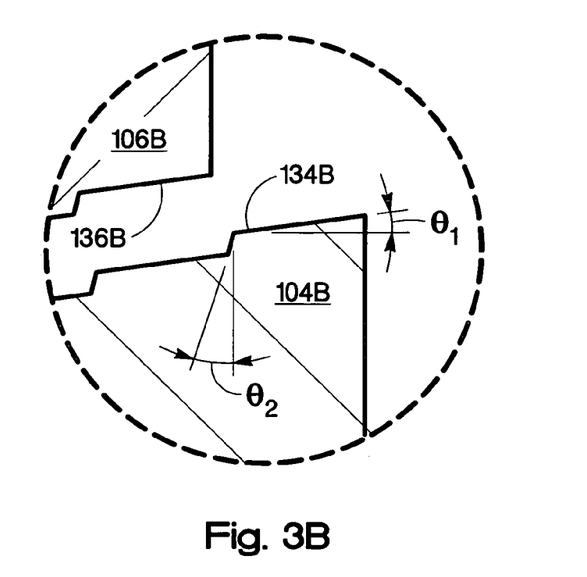

In FIG. 3B a variety of terraced profiles can be formed by varying the angle Theta 1 which contributes to the terrace rise in the z-axis 120 direction and the angle Theta 2 which contributes to the terrace run in the y-axis 118 direction. For example, a stair step profile can be achieved when Theta 1 and Theta 2 are essentially near zero degrees. As another example, a grooved profile can be achieved when Theta 1 is about negative 60 degrees, and Theta 2 is about 30 degrees. Other angles for Theta 1 and Theta 2 can be chosen to optimize the profile for a particular application. The range of angles for Theta 1 and Theta 2 is from positive 90 to negative 90 degrees. A grooved profile can have the advantage of minimizing the amount of reflection from a surface. The angles Theta 1 and Theta 2 can be chosen to reduce the amount of undesirable reflection or ghosting between the optical elements, optical components, or combinations of optical elements and optical components. If the angles Theta 1 and Theta 2 are chosen such that a reflection of the image will be diverted to one side or the other of the image path, then ghosting reflections can be minimized.

Although a terracing profile for optical elements 104B and 106B has been shown and described, other profiles which are similar to terracing can provide similar benefits to terracing. Example profiles are: mating rectangular channels, mating rectangular channels with tapered sidewalls, mating channels with tapered sidewalls, mating channels with curved bottom profiles, mating channels with curved top profiles, and sinusoidal profiles. Although these examples have been provided for better understanding an embodiment of the invention, these profiles are not intended to limit the invention. It should be understood that the invention includes and covers other profiles. Also, use of profiling is not restricted to the surface of optical elements 104B and 106B. As shown in FIG. 3A, the surface of other optical components and optical elements can be profiled, such as, for example, the adjoining surface between optical element 104B and optical component 102. The examples presented herein help to explain that a profile on the surface of optical elements can be used advantageously for alignment and assembly strength when the optical elements or components are affixed together using adhesive, clamping or other methods of coupling. These profiles are exemplary and thus are not limiting to the invention.

Figure 4:
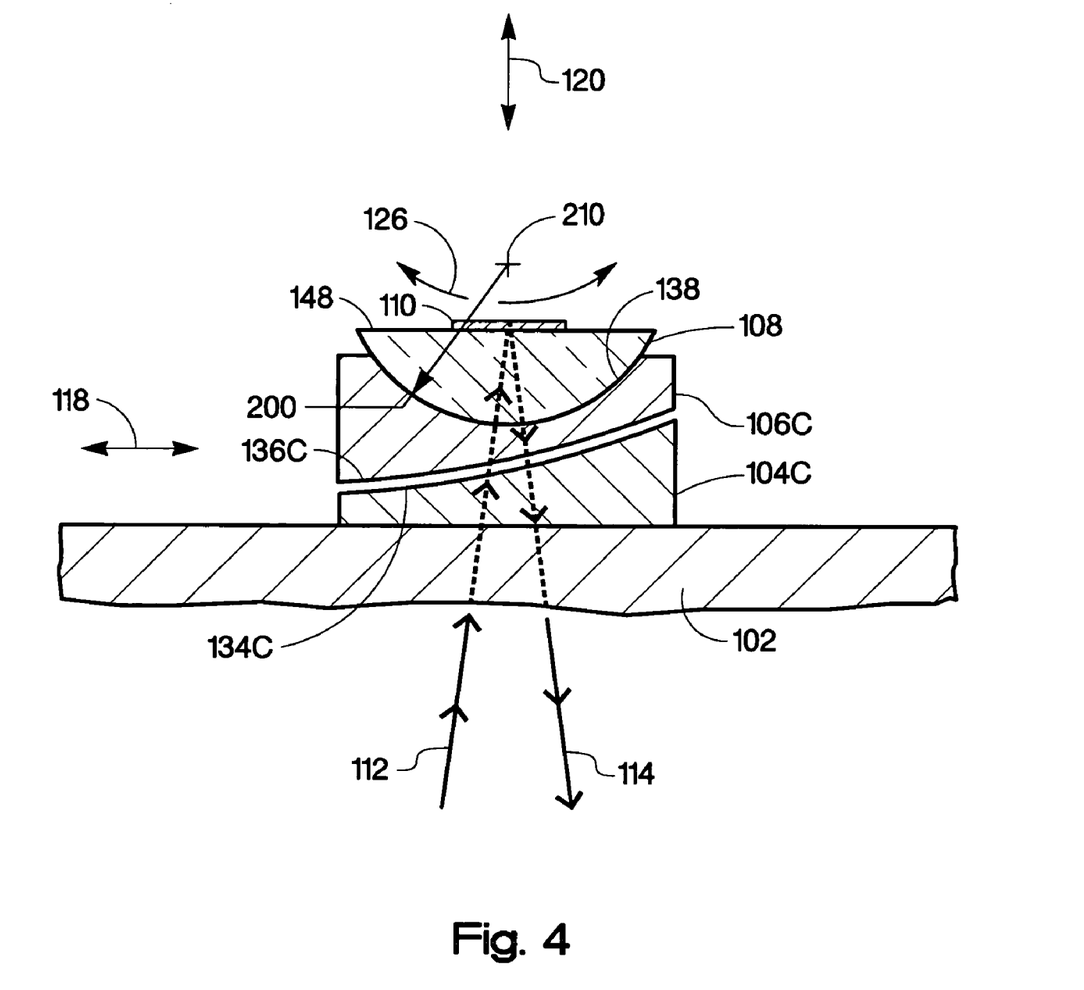
FIG. 4 is a cross-sectional view of yet another embodiment of the invention.

FIG. 4 is a cross sectional view of yet another embodiment of the invention. The cross section in FIG. 4 is similar to the cross section in FIG. 2. However in FIG. 4, optical elements 104C and 106C have curved surfaces 134C and 136C respectively, whereas in FIG. 2, optical elements 104A and 106A have planar surfaces 134A and 136A respectively. The curved shape allows for various rates of positional adjustment in the z-axis 120 for equal displacements of first optical element 104C relative to second optical element 106C in the y-axis 118 direction. In other words, for a specific amount of y-axis 118 displacement, the assembly in FIG. 4 will move in the z-axis 120 direction more when optical element 106C moves to the right in the y-axis direction 118 relative to optical element 104C than when optical element 106C moves to the left for the same amount of y-axis displacement 118 relative to optical element 104C.

Therefore, the curved surfaces 134C and 136C of optical components 104C and 106C respectively provide different z-axis 120 focus adjustment rates between first optical component 102 and second optical component 110. Initially, when optical element 106C moves to the right in the y-axis direction 118 relative to the optical element 104C, the second optical component 110 moves at a relatively small positional rate in the z-axis 120 direction relative to optical component 102. Then, when optical element 106C continues to moves to the right in the y-axis direction 118 relative to the optical element 104C, the second optical component 110 moves at a progressively increasing positional rate in the z-axis 120 direction relative to optical component 102. This progressive rate of z-axis 120 focus in FIG. 4 results in a variable rate of z-axis 120 focus compared to the linear rate of the z-axis 120 focus achieved by optical elements 104A and 106A as shown in FIG. 2. This variable rate may be used advantageously when relatively small z-axis positional adjustments, such as precision focus adjustments are needed.

The positional adjustment in the y-axis 118 between the first optical component 104C and the second optical component 106C causes a rotation 126 of second optical element 106C with respect to first optical element 104C; however, this rotation can be compensated for by rotating partially spherical optical element 108 in the spherical recession 138 in optical element 106C.

Figure 5:
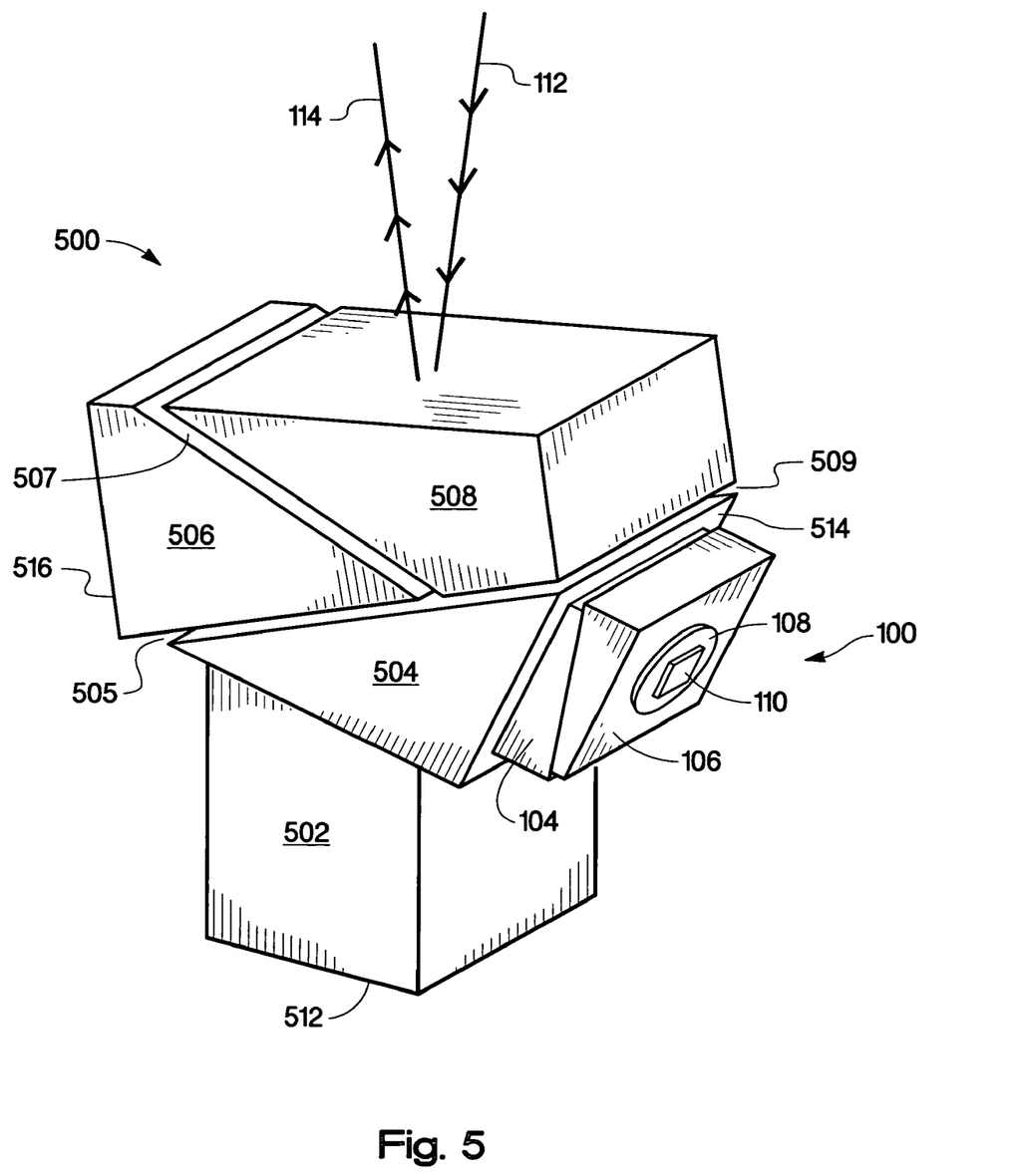
FIG. 5 shows total internal reflection (TIR) prisms for a projection system according to an embodiment of the invention.

FIG. 5 shows the totally internally reflecting (TIR) prism assembly 500. This prism assembly can be used in a color projector having three light modulators without a color wheel. One of the three light modulators 110 is shown. The prisms are transparent and the three light modulators each render a component of an image in red, green, and blue.

The base of the TIR prism assembly 500 is a prism 502 having a surface 512. The optical assembly 100 of FIG. 1 (not shown in FIG. 5) is mounted to the surface 512 of the prism 502 for the purpose of rendering the red component of the image. A prism 504 is mounted to the prism 502 and the optical assembly 100 is mounted to a surface 514 of the prism 504 for the purpose of rendering the blue component of the image. A prism 506 is mounted proximate the prism 504 where a gap 505 exists between prisms 504 and 506. The gap 505 is typically about 10 microns, although the gap distance may vary according to application. The optical assembly 100 of FIG. 1 (not shown in FIG. 5) is mounted to a surface 516 of the prism 506 for the purpose of rendering the green component of the image. A prism 508 is mounted proximate the prisms 504 and 506 where a gap 507 exists between the prism 506 and the prism 508, and a gap 509 exists between the prism 504 and the prism 508. Gap 507 and gap 509 are typically about 10 microns, although the gap distance may vary according to application. The prisms, gaps, and optical assemblies will be described in reference to FIGS. 6, 7 and 8. Although each of the prisms 502, 504, and 506 have been described to render the colors red, blue, and green respectively, it is also possible that the prisms can render different colors. For example, prism 502 could be configured to render green or blue, prism 504 can render green or red, and prism 506 can render red or blue. Other colors such as yellow or variations of blue or red may also be used to achieve a different color gamut. Although three optical assemblies 100, each mounted to an optical prism, have been described, it is possible that the second optical component 110 can be directly mounted to surface 514 of optical prism 504. The other two optical assemblies 100 (not shown) can be mounted to surfaces 512 and 516 of prisms 502 and 506 respectively. These two optical assemblies 100 (not shown) can then be precision aligned to the optical component 100 which has already been directly affixed to the surface 514 of prism 504.

Incident white light 112 enters the prism assembly 500 and is separated into red, green, and blue. Each color is directed to one of the three light modulators where images are formed, one for each of the three colors. The three separate colored images are superimposed to form a gamut colored image 114 which exits from the prism assembly 500. To render images with the best quality, the three light modulators need to be aligned with each other. This alignment is accomplished with the optical components and optical elements described in reference to FIGS. 1-4. Although the embodiments of this invention have been shown on a TIR prism assembly 500 having three colors, this invention is not limited to three prisms nor to projector systems. This invention can be used for projectors having more or less than three prisms or more or less than three colors. Also, this invention is not limited to projectors, as it finds application in areas including, but not restricted to: aligning optical plates, optical filters, optical lens, photodiodes, photodiode arrays, photodiode matrices, optical fibers in opto-electronic devices. The invention also finds application to systems including, but not limited to, rangefinders, magnifiers, binoculars, telescopes, spectrometers, microscopes, analytical equipment, optical communication equipment, and fabrication equipment.

Figure 6:
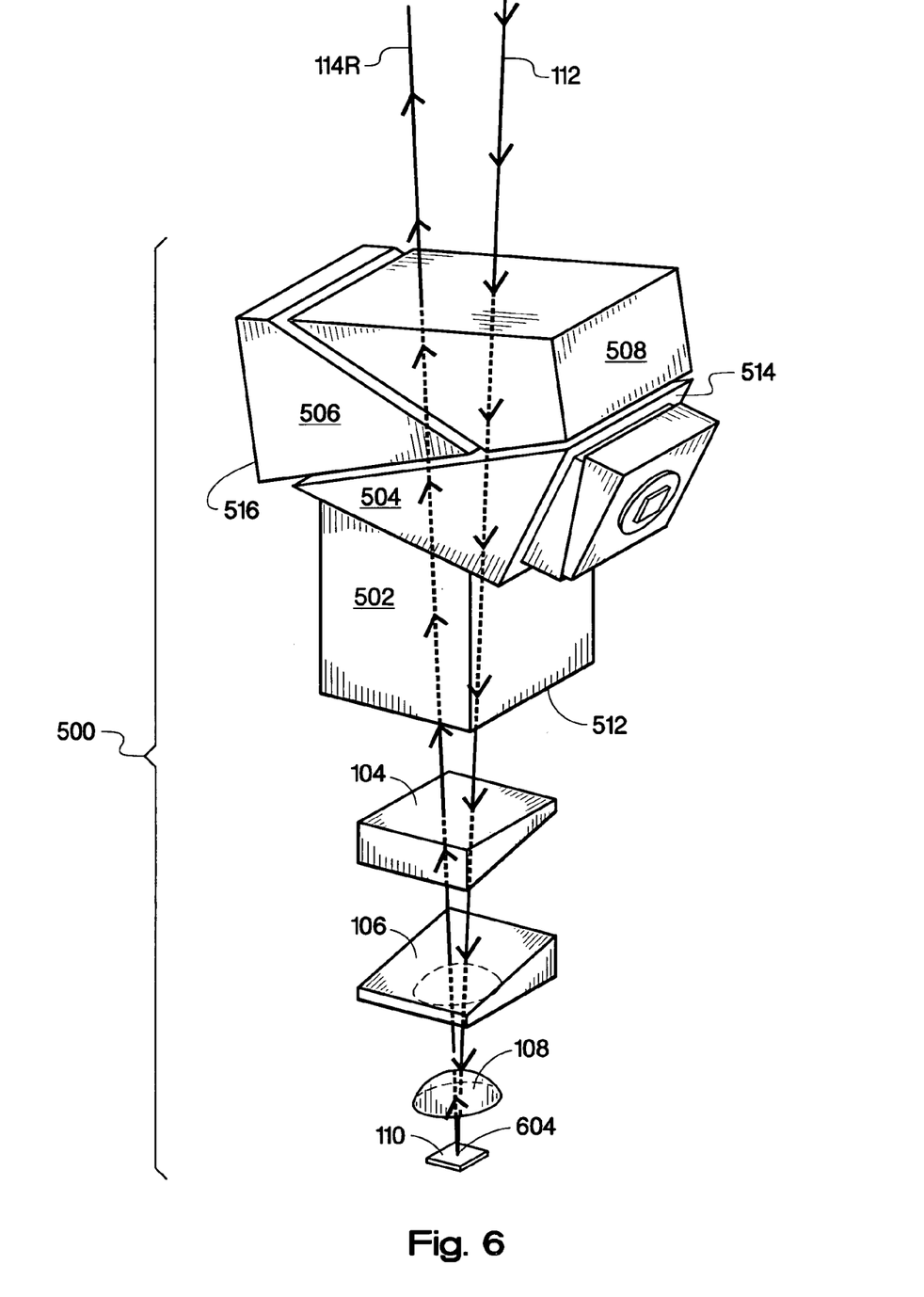
FIG. 6 shows the light path for one of the light modulators in a three light modulator projection system according to an embodiment of the invention.

FIG. 6 shows the TIR prism assembly 500 of FIG. 5 for rendering a red image. However, as previously mentioned, each of the prisms 502, 504, and 506 have been described to render the colors red, blue, and green respectively, it is also possible that the prisms can render different colors. For example, prism 502 could be configured to render green or blue, prism 504 can render green or red, and prism 506 can render red or blue. Other colors such as yellow or variations of blue or green may also be used in prism 502 to achieve a different color gamut. Therefore, the colors green, blue, or another color could be rendered without deviating from the intent of the invention. The optical elements 104, 106, 108, and the optical component 110 are mounted to surface 512 of prism 502, although for illustration they are shown using an exploded view.

Incident white light 112 enters prism 508. The green and blue portions of the white light are reflected from coatings applied to prism 504 and 506 further described in reference to FIG. 7 and FIG. 8. The red light travels through the prisms 508, 506, 504, 502, the first wedge shaped optical element 104, the second wedge shaped optical element 106, and the partially spherical third optical element 108, where the red light 114R reflects 604 off optical modulator 110. The reflected red light 114R passes back through the partially spherical third optical element 108, the second wedge shaped optical element 106, the first wedge shaped optical element 104, and through the prisms 502, 504, 506, and 508 so that the red light, 114R renders a red portion of the image. As previously mentioned, the color red is exemplary, and other colors may be used. Prism 502 is an optical component and therefore serves as a base for which to mount optical element 104. The optical modulator component 110 is positioned and aligned to the prism optical component 502 using optical elements 104, 106, and 108 as described in reference to FIGS. 1-4 and 9.

Figure 7:
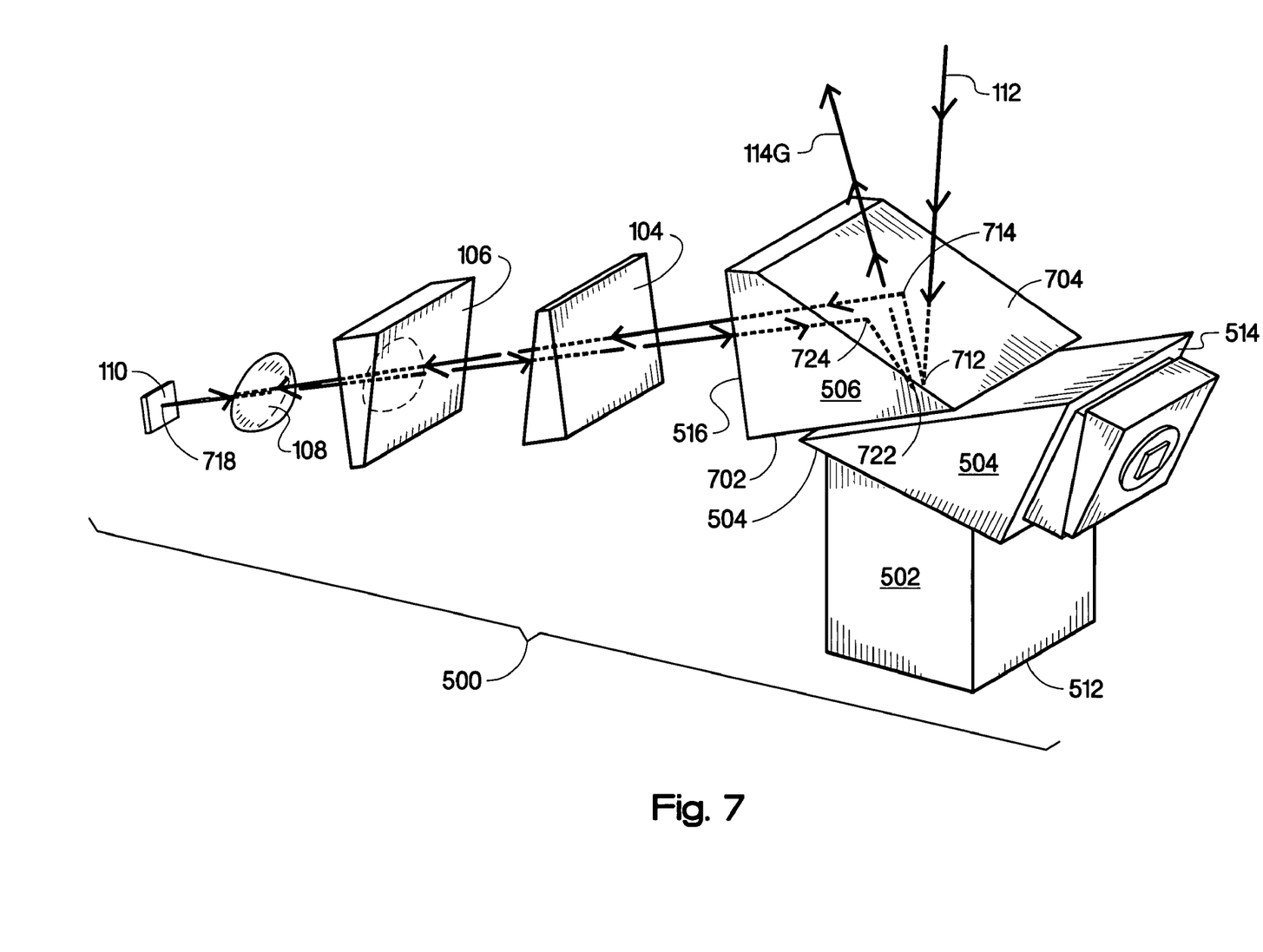
FIG. 7 shows the light path for one of the light modulators in a three light modulator projection system according to another embodiment of the invention.

FIG. 7 shows the TIR prism assembly 500 of FIG. 5 where prism 508 has been removed for clarity. FIG. 7 renders a green image, however, as previously mentioned each of the prisms 502, 504, and 506 have been described to render the colors red, blue, and green respectively, it is also possible that the prisms can render different colors. For example, prism 502 could be configured to render green or blue, prism 504 can render green or red, and prism 506 can render red or blue. Other colors such as yellow or variations of blue or red may also be used in prism 506 to achieve a different color gamut. Therefore, the colors red, blue, or other colors could be rendered without deviating from the intent of the invention. The optical elements 104, 106, 108, and optical component 110 are mounted to surface 516 of prism 506 and are shown in an exploded view.

Incident white light 112 enters prism 506, reflects 712 off a coated surface 702 that reflects green light although allows the red and blue light to pass. The green light then reflects 714 off the surface 704 due to total internal reflection and passes through the optical elements 104, 106, 108, and reflects 718 off the optical modulator component 110. The green light then passes back through the optical elements 108, 106, 104, and reflects 724 off the surface 704 due to total internal reflection and reflects 722 off the coated surface 702. Since surface 702 has a green reflective coating, the green reflected light 114G renders the green portion of the image.

For the best image quality, it is important for the green image to align to the red image in FIG. 6. The optical modulator component 110 is precision aligned to the prism optical element 506 using optical elements 104, 106, and 108 as described in reference to FIGS. 1-4 and 9.

Figure 8:
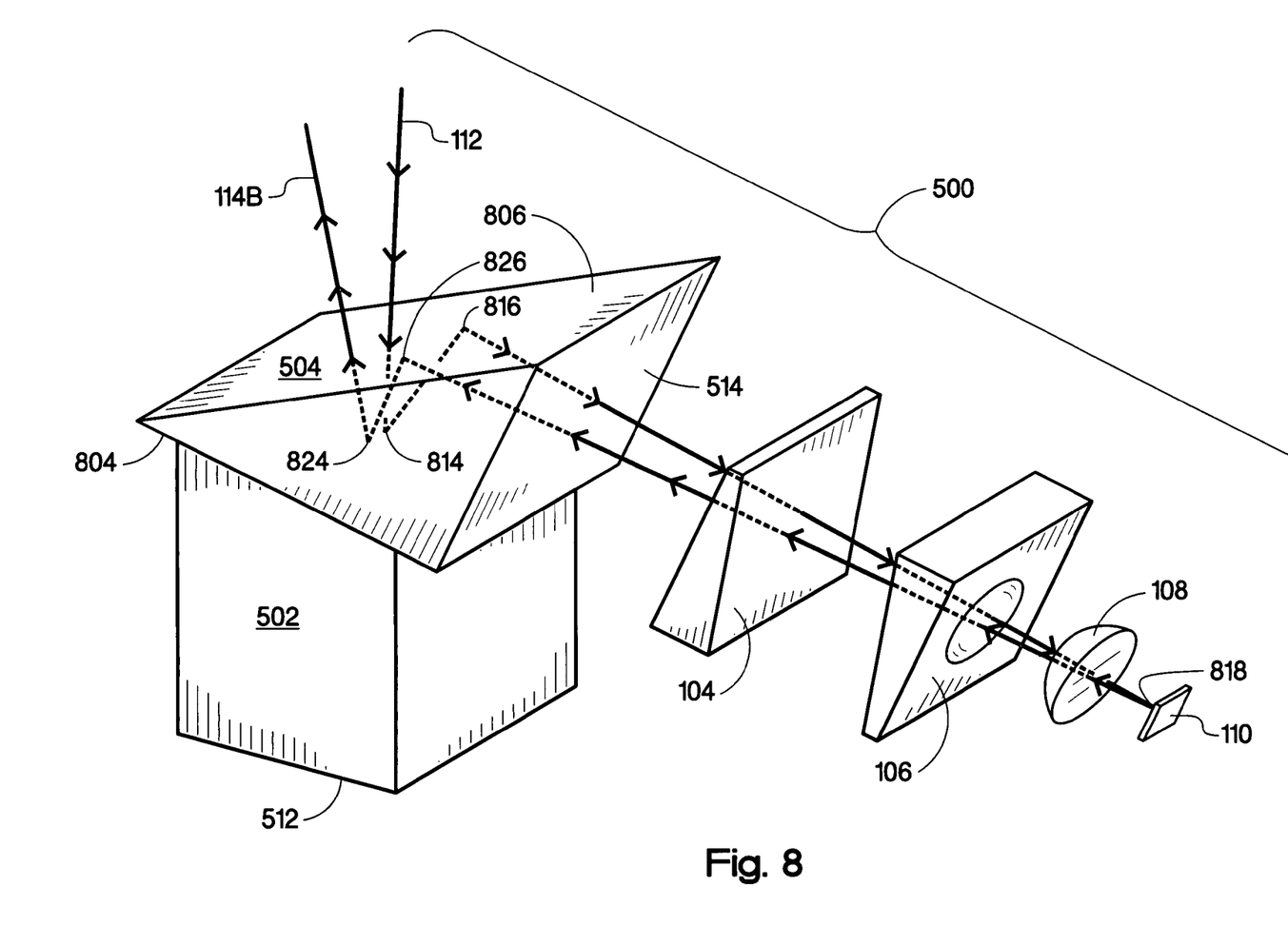
FIG. 8 shows the light path for one of the light modulators in a three light modulator projection system according to yet another embodiment of the invention.

FIG. 8 shows the TIR prism assembly 500 of FIG. 5 where the prisms 506 and 508 have been removed for clarity. FIG. 8 renders a blue image, however, as previously mentioned each of the prisms 502, 504, and 506 have been described to render the colors red, blue, and green respectively, it is also possible that the prisms can render different colors. For example, prism 502 could be configured to render green or blue, prism 504 can render green or red, and prism 506 can render red or blue. Other colors such as yellow or variations of green or red may also be used in prism 504 to achieve a different color gamut. Therefore, the colors green, red, or other colors could be rendered without deviating from the intent of the invention. Optical elements 104, 106, 108, and optical component 110 are mounted to surface 514 of prism 504, but are shown using an exploded view.

Incident red and blue light 112 (green has been reflected off by a coating on the surface 702 of prism 506 shown in FIG. 7) enters prism 504, reflects 814 off a coated surface 804 which reflects the blue light but allows the red light to pass. The blue light then reflects 816 off surface 806 due to total internal reflection and passes through optical elements 104, 106, 108, and reflects 818 off optical modulator component 110. Finally, the blue light passes back through optical elements 108, 106, 104, and reflects 826 off surface 806 due to total internal reflection. Then, the blue light reflects 824 off of surface 804 which has a coating to reflect blue and the blue light 114B renders the blue portion of the image.

The alignment of the optical modulator component 110 to the prism component 514 uses optical elements 104, 106, and 108 as described in reference to FIGS. 1-4 and 9. For the best image quality, it is important for the blue portions of the image in FIG. 8, the red portions of the image in FIG. 6 and the green portions of the image in FIG. 7 to align to each other. Precise alignment of the red, green, and blue portions of the image are required to render the image with a good color gamut.

Figure 9:
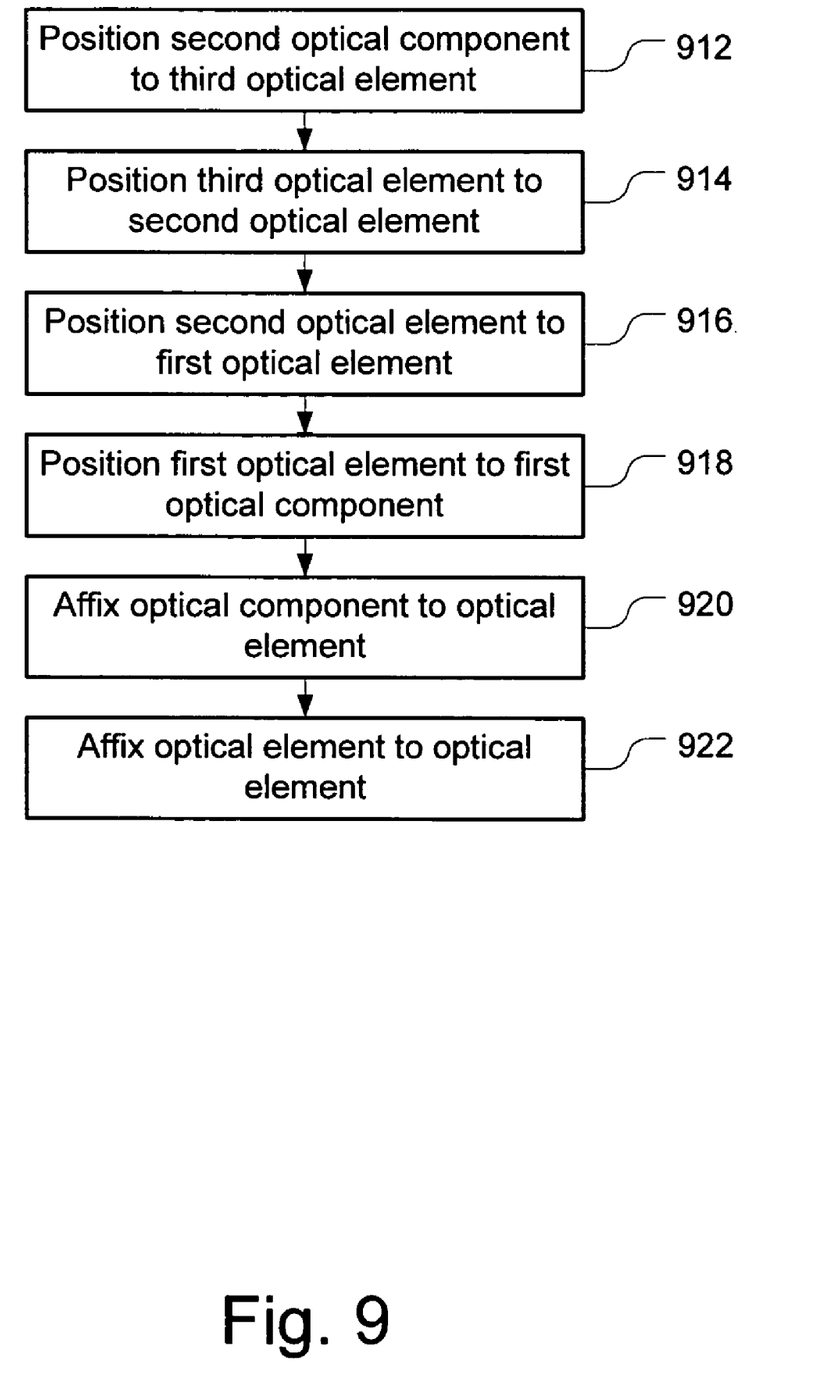
FIG. 9 is an exemplary process flow chart showing the procedural steps for aligning an optical assembly according to an embodiment of the invention.

FIG. 9 shows the procedural steps for aligning the optical assembly 100 which is shown in FIG. 1 according to an embodiment of the invention.

A first optical component is provided. The first optical component 102 is illustrated in FIG. 1. More specifically, the first optical component is shown as an optical prism such as 502, 504, or 506 in FIG. 5. The optical component can be, but is not limited to, a lens, an optical filter, a polarizer, a photo-sensor, a photo-array, a light emitting diode, a laser diode, a light source, an optical component, and opto-electronic component, an optical waveguide, or a substrate that holds an optical component such as a substrate formed from a stamped, injection molded, or machined part. The first optical component 102 may have one of many surface profiles to aid in alignment and to help create a strong coupling between another optical element.

The first optical element is placed proximate the first optical component. The first optical element is a transparent wedge 104 as shown in FIG. 1. The optical wedge 104 may have one of many surface profiles to aid in alignment and to help create a strong coupling between another optical element or an optical component.

The second optical element 106 is placed proximate the first optical element 104 as shown in FIG. 1. The second optical element is another transparent wedge 106 as shown in FIG. 1. The optical wedge 106 may have one of many surface profiles to help facilitate alignment and to create a stronger coupling between the optical element and optical component.

The third optical element 108 is placed proximate the second optical element 106 as shown in FIG. 1. The third optical element 108 is the partial sphere with a planar surface. The spherical portion is placed in the spherical recession 138 formed in optical element 106 as shown in FIG. 1.

The second optical component 110 is placed proximate the planar surface 148 of the third optical element 108 as shown in FIG. 2. The second optical component is exemplarily shown to be an optical modulator 110. However, the second optical component can be, but is not limited to, a lens, a photo-sensor, an optical filter, a polarizer, a photo-array, or an optical waveguide.

In step 912 the second optical component 110 is shown as an optical modulator in FIG. 1; however other optical components may be used. The second optical component 110 can be positioned in the x-axis 116, the y-axis 118, and rotation around the z-axis 130. The second optical component 110 can be positioned manually by using a lead-screw type of apparatus such as typically used in a micrometer. Also, an automated alignment tool having robotic positioners and vision systems for precisely positioning components, or other types of positioners could be used. For a projection device, a typical method for aligning an optical component relative to another optical component is to project an image on to a screen and align one color or feature to another color or feature. The projected image may be a test pattern specifically designed to aid the alignment process. Other methods for alignment may also be used, such as, but not restricted to using an optical visions system with positional feedback. The optical component can be positioned with automated actuators and optical vision systems used for positional feedback.

In step 914 the partially spherical third optical element 108 can be adjusted around the x-axis 126, the y-axis 128, and the z-axis 130 as shown in FIG. 1. The partially spherical third optical element 108 can be adjusted by using a lead screw on a gimbaled mechanism to achieve rotational alignment or by using other methods. Automated alignment tooling having robotic positioners and vision systems for precisely positioning components could also be used. The alignment can be monitored by using an image projected through the optical elements and components. Metrology tools such as vision systems, optical comparators, or other measurement methods may be used to monitor the alignment and to provide feedback to the alignment system.

In step 916 the second optical element 106 can be positioned in the x-axis 116 and the y-axis 118 as shown in FIG. 1. The second optical element 106 can also be rotated around the z-axis 130. However, the rotation around the z-axis 130 also causes tilting around the x-axis 126 and around the y-axis 128. Although, the tilting can be compensated for by adjusting partially spherical optical element 108, the tilting may be undesirable and can be avoided by not adjusting the second optical element 106 around the z-axis 130. When the second optical element 106 is positioned in the y-axis 118 relative to the first optical element 104 as shown in FIG. 1, the z-axis 120 height is adjusted. The z-axis height is typically a focal plane for optical systems and this z axis height can be monitored by optically projecting the image and measuring the sharpness of the image and fed back to the alignment system. Other methods may also be used to monitor the z-axis such as an interferometer.

In step 918, a first optical element is positioned relative to the first optical component. The first optical element shown as the transparent wedge 104 is positioned relative to the first optical component 102 in FIG. 1. As described previously, the optical wedge 104 may have a variety of surface profiles to help facilitate alignment and to create a stronger coupling between the optical element 104 and optical component 102 for resisting the deleterious effects of thermal and mechanical shock and vibration. The first optical element 104 can be slidably positioned in the x-axis 116, the y-axis 118, and rotation about the z-axis 130 as shown in FIG. 1. The first optical element 104 can be positioned manually by using a lead-screw type of apparatus such as typically used in a micrometer. Also, an automated alignment tool having robotic positioners and vision systems for precisely positioning components, or other types of positioners could be used. For a projection device, a typical method for aligning an optical component relative to another optical component is to project an image on to a screen and align one color or feature to another color or feature. The projected image may be a test pattern specifically designed to aid the alignment process. Other methods for alignment may also be used, such as, but not restricted to using an optical vision system with positional feedback.

In step 920 the optical elements are affixed to the optical components. An optical element such as a transparent wedge 104 is affixed to an optical component such as a prism 504 such as shown in FIG. 5. The optical element can be affixed to the optical component by using an adhering step having an ultraviolet curable adhesive between the optical component and the optical element prior to alignment, performing the alignment such as in step 912, and when the alignment is correct, illuminating the optical component and the optical element with ultraviolet light. Alternately, the optical component and optical element may be affixed by using an adhering step having a thermally curing adhesive, a time setting adhesive, a wicking adhesive or other adhesive methods. Rather than using an adhesive, a clamping step having a spring or other type of clamp may be used to affix the optical component to the optical element. An optical component such as an optical modulator 110 may also be affixed to optical component 108 as shown in FIG. 5 using adhesive and clamping steps.

In step 922 optical elements are affixed to optical elements. A partially spherical optical element 108 is affixed to another optical element such as a transparent wedge 106 as shown in FIG. 5. The optical elements can be affixed to each other using an adhering step and a clamping step as described in step 920. Optical element 104 can also be affixed to optical element 106 as shown in FIG. 5 using adhering and clamping steps as described in step 920.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. An optical assembly comprising:
   a transparent first wedge with a first and a second surface;
   a transparent second wedge with a first and a second surface, wherein the first surface has a spherical recession with a radius;
   a transparent partial sphere including a substantially planar first surface and a spherical second surface, wherein the spherical second surface has substantially the same radius as the spherical recession in the first surface of the second wedge; and
   wherein the first surface of the first wedge is coupled to the second surface of the second wedge, and the second surface of the partial sphere is coupled to the spherical recession in the first surface of the second wedge.

2. The optical assembly in claim 1, wherein the first surface of the first wedge and the second surface of the second wedge have means for reducing the reflection between the two wedges and means for increasing the adhesion between the two wedges.

3. The optical assembly in claim 2, where means for reducing the reflection between the two wedges and means for increasing adhesion between the two wedges is a terraced profile.

4. The optical assembly in claim 3, wherein the terraced profile of the first surface of the first wedge and the terraced profile of the second surface of the second wedge are substantially matched, and whereby the first wedge and the second wedge engage with minimal gaps between the two wedges.

5. The optical assembly in claim 1, wherein the first surface of the first wedge and the second surface of the second wedge are curved having substantially the same radii.

6. The optical assembly in claim 1, wherein the coupling of the first surface of the first wedge to the second surface of the second wedge and the second surface of the partial sphere to the first surface of the second wedge is a transparent adhesive substantially index matched to the first wedge and the second wedge.

7. The optical assembly in claim 6, wherein the adhesive is selected from the group consisting of a transparent ultraviolet setting curable adhesive, a transparent thermally setting curable adhesive, and a transparent time setting curable adhesive.

8. The optical assembly in claim 1, further comprising a first optical component coupled to the second surface of the first transparent wedge and a second optical component coupled to the first surface of the transparent partial sphere.

9. The optical assembly in claim 8, wherein the first optical component is an apparatus selected from the group consisting of a prism and a micro-display.

10. The optical assembly in claim 8, wherein the second optical component is an apparatus selected from the group consisting of a prism and a micro-display.

11. The optical assembly in claim 8, wherein the coupling between the first optical component and the second surface of the first transparent wedge, and the coupling between the second optical component and the transparent sphere is an index matched adhesive selected from the group consisting of a transparent ultraviolet setting curable adhesive, a transparent thermally setting curable adhesive, and a transparent time setting curable adhesive.

12. An optical prism assembly having a first optical assembly as in claim 8, further comprising:
    the first optical assembly coupled to a first prism; and
    an optical modulator coupled to a second prism, wherein the first prism is coupled to the second prism.

13. The optical prism assembly in claim 12, further comprising a second optical assembly coupled to a third prism, wherein the third prism is coupled to at least one of the first and second prisms.

* * * * *

UNITED STATES PATENT AND TRADEMARK OFFICE
CERTIFICATE OF CORRECTION

PATENT NO. : 7,349,604 B2 Page 1 of 1
APPLICATION NO. : 11/345103
DATED : March 25, 2008
INVENTOR(S) : Stephan Clark It is certified that error appears in the above-identified patent and that said Letters Patent is hereby corrected as shown below:

In column 14, line 18, in Claim 12, delete "claim 8" and insert -- claim 1 --, therefor.

Signed and Sealed this

Twelfth Day of August, 2008

JON W. DUDAS
*Director of the United States Patent and Trademark Office*